Patented Sept. 8, 1931

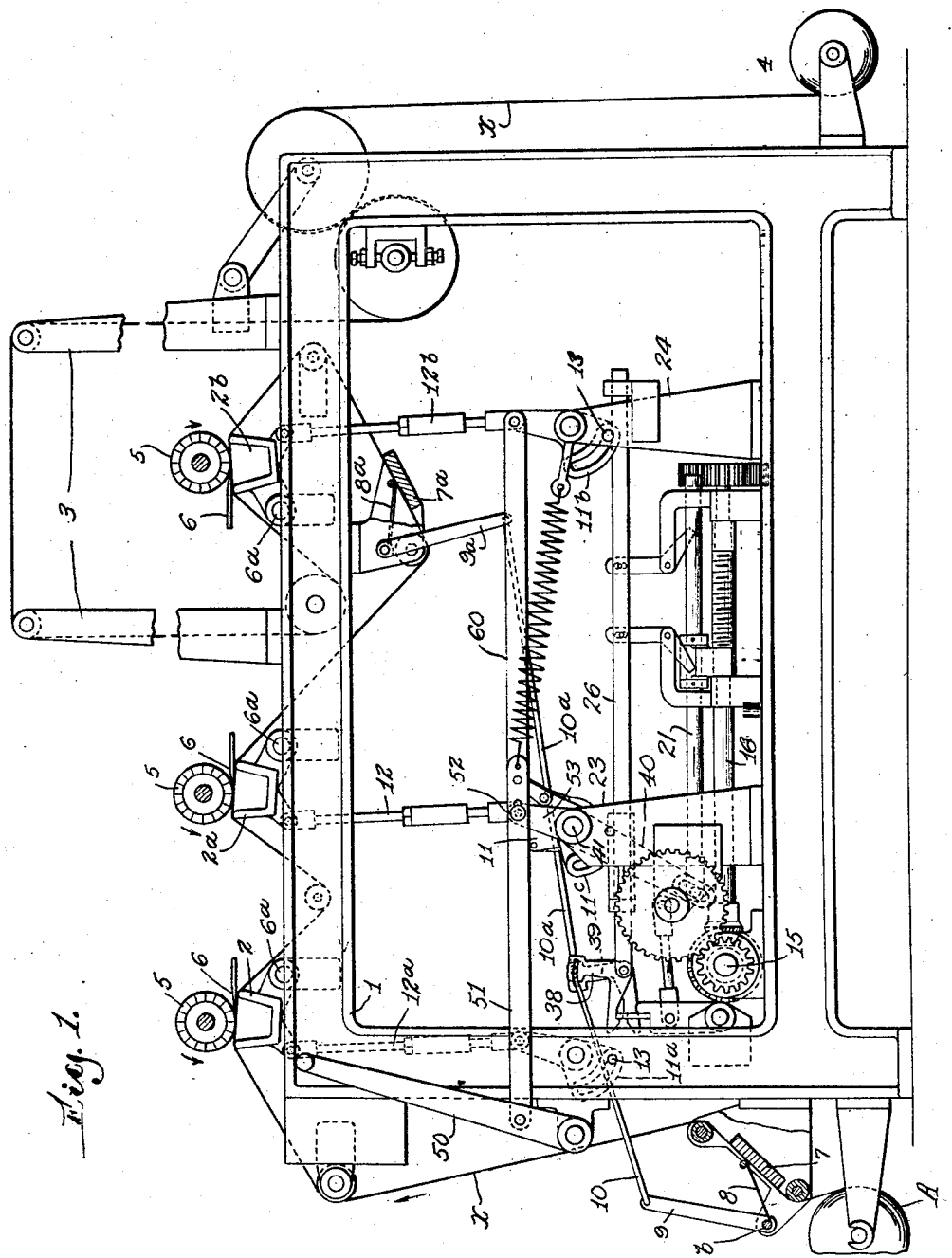

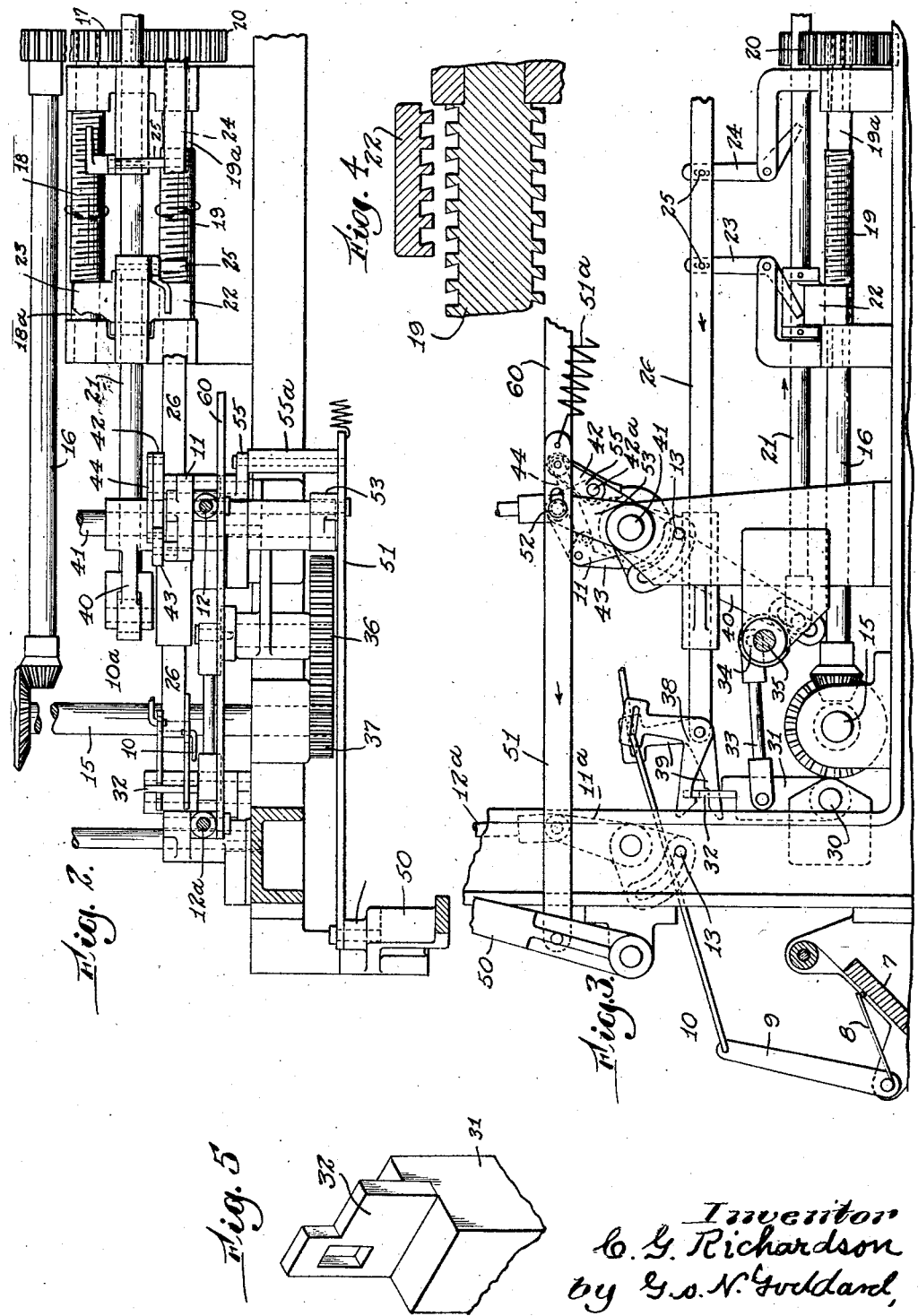

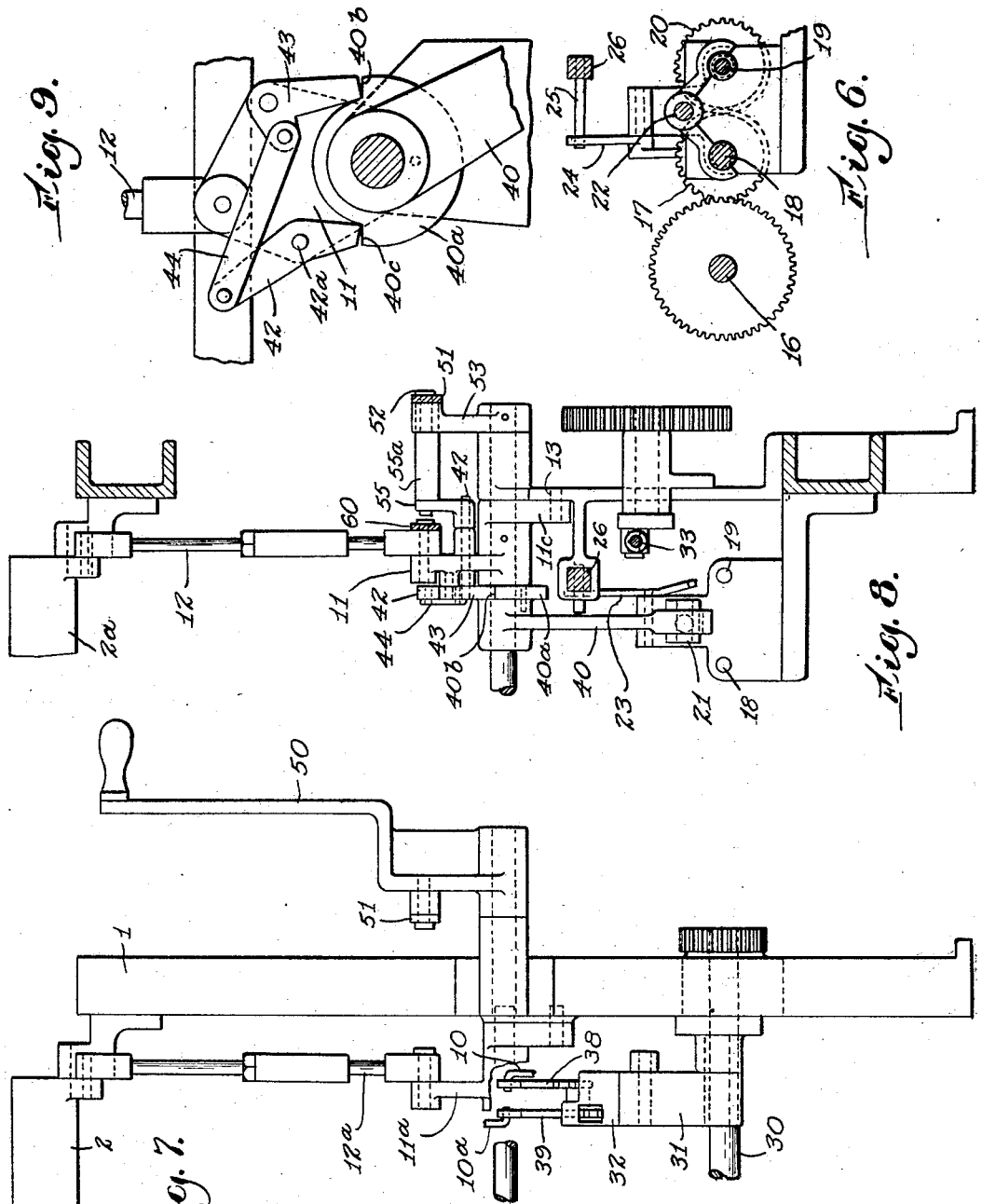

1,822,374

UNITED STATES PATENT OFFICE

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT

SEAM-CONTROLLED SHEARING MACHINE

Application filed December 26, 1929. Serial No. 416,447.

This invention relates to cloth shearing machines and is intended to provide a simple, reliable and effective means for automatically protecting the cloth from being cut when the seamed connection between two adjacent ends is passing between the shearing elements.

As is well known in the art, when pieces of cloth are put through a shearing machine to crop or shear the nap it is customary to sew the free ends of one or more pieces of cloth to one another to form, in effect, an endless belt which can be continuously run through the machine to effect the shearing or cropping of the nap. This necessitates, however, provision of means for preventing the shear blades from cutting the sewed together ends which, by reason of the extra thickness, would be cut through by the shear blades were not the shearing elements, comprising the cloth rest on the one side and the rotary fly blades and associated ledger blade on the other side, separated to permit the sewing or seam to pass through without injury. This protective separation of the shearing elements has long been accomplished by means of lever connections under the control of the operator by which either the cloth rest could be dropped away from the shearing line or the fly blade and the ledger blade could be lifted away from the cloth rest.

Various expedients have been resorted to to provide an automatic control actuated by means of the seam or sewing itself when approaching the shearing line, so that in case of neglect on the part of the shear operator no injury is done.

The present invention has for its object the automatic dropping and raising of one or more cloth rest elements of a single or of a multiple shear, this being accomplished by the action of the seam itself approaching the shear in a manner that is fully dependable and that puts only a very slight extra stress on the cloth. At the same time provision is made for complete control by the operator without interfering with the automatic mechanism, since it is often desirable that the operator should have control independently of the automatic mechanism to separate the shearing elements, or to restore them to operative shearing position. The device is equally applicable to a single shear or to a multiple shear and to a shear that operates on only one side of the cloth or to a shear that operates on both sides of the cloth.

In the accompanying drawings I have illustrated a simple and convenient form of construction and arrangement embodying the principles of this invention as applied to a multiple shear for shearing both sides of the cloth, in which drawings Fig. 1 is an elevation of the right hand side of a multiple shear for shearing both sides of the cloth embodying my principles of automatic control.

Fig. 2 is a detail plan view showing the mechanism by which the controlled movements of the shearing elements are effected.

Fig. 3 is a detail view in side elevation of the mechanism shown in Fig. 2.

Fig. 4 is a central cross section through one of the actuating screws by which the alternating rest-dropping and rest-restoring movements are controlled.

Fig. 5 is a detail view of the actuator by which either actuating screw is set in operation.

Fig. 6 is a cross sectional view through the actuating screws showing their driving train.

Fig. 7 is a front elevation of a portion of the cloth rest controlling mechanism showing the hand lever connection therewith.

Fig. 8 is a front elevation showing the details of construction of the mechanism by which both automatic and hand control of the cloth rest is effected.

Fig. 9 is an enlarged rear side elevation of the interconnected pawls and ratchet by which the automatic control is released to allow hand operation of the cloth rests.

In the practice of the invention according to the form illustrated, I have shown in Fig. 1 a side frame 1, along whose top at suitable intervals are arranged the rotary fly blades 5 and their associated ledger blades 6 carried in the usual frame, not here shown, above their respective gap cloth rests 2, 2$^a$ and 2$^b$ which, as illustrated, are in the form of a hollow trough extending transversely of the shearing machine beneath and in parallelism with the axes of the fly blades and pivotally mounted upon centers 6ª to allow them to swing downward away from their respective shearing couples to allow the seam or sewing to pass between without injury.

The roll of cloth A is mounted at the front lower part of the machine to allow the cloth to unwind, its course of travel through the machine being indicated by line X. From the roll it passes over suitable guides above a table or plate 7 which forms a flat support for the travelling cloth at this point and a feeler member, or light frame 8, pivotally supported at 8ᵇ normally presses lightly against the upper face of the cloth so that, when the extra thickness of the sewing or seam passes between the table and the feeler, the latter will be raised slightly rocking the arm 9 in a counterclockwise direction, thus exerting a pull on the link 10, which is transmitted to a part of the actuator mechanism to effect the dropping of the cloth rests.

The cloth rests are supported in their raised or operative position by means of toggle arms 12, 12ª and 12ᵇ which are pivotally connected with shorter toggle arms 11, 11ª and 11ᵇ, the lower ends of these levers being provided with a slotted sector adapted to receive fixed stop pins 13 to limit the oscillation of the upper arm of the lever toward the right to a point but very slightly beyond the dead center, while limiting the movement of the upper arms of these levers to the left when they have turned on their axes sufficiently to flex the toggle and allow the cloth rests to drop to inoperative position.

To relieve the delicate cloth feeler mechanism from the heavy duty of flexing the toggles over the center to allow the cloth rest to drop and for returning the toggles to operative position to sustain the cloth rest in working position, I have provided an actuating mechanism that is driven by power communicated from the drive shaft of the shearing machine, this actuating mechanism being set in operation merely through the shifting of a movable latch or starting member that is light and easily operated by the feeler device actuated by the cloth. From a transverse shaft 15, which may be the power, or a power driven shaft, I transmit rotary motion to a rearwardly extending shaft 16 through the medium of a bevel gear connection shown in Fig. 2.

At the rear end the shaft 16 carries a pinion which intermeshes with a pinion 17 on the end of a threaded shaft or screw 18, while the pinion 17 also meshes with a companion pinion 20 that is secured to another threaded shaft or screw 19 so that these two screws rotate in opposite directions, as indicated by appropriate arrows. Somewhat above, and in a vertical plane intermediate of the screw shafts 18 and 19 and extending parallel therewith, is a slide rod 21 on which is pivotally mounted an angular rock nut 22, which is free to rock on the shaft 21 but is held against longitudinal displacement thereon. The arms of this angular rock nut have their outer or free ends recessed and threaded to form engagement with the screw threads 18 and 19. The angular relation of the two arms of the rock nut 22 is such that when one is depressed into operative engagement with its adjacent actuating screw the other is disengaged from its screw. Inasmuch as the screws 18 and 19 rotate in opposite directions, while their threads run in the same direction, it will be seen that when the rock nut 22 is at the extreme left, with an arm engaged with the screw 18, such engagement will cause the nut to travel to the right by reason of the rotation of the screw. On the other hand, when the opposite arm is engaged with the screw shaft 19, it will cause the nut to travel toward the left. As shown in Fig. 4, the groove, or thread, in the arm of the nut 22 that engages the screw 18 is undercut on the side toward the direction of its travel to form an oblique engagement with the correspondingly undercut thread rib, so that any tendency of the nut to be pressed out of place is prevented by this oblique engagement. Screw 19 and its corresponding threaded member of the rocking nut 22 are likewise undercut on the opposite side to that of screw 18 for a similar reason. That portion of each screw that underlies the nut at the end of the traverse caused by that screw is preferably made smooth or without an actuating thread to allow the nut to idle when it has reached the end of its traverse. This is shown at 19ª and at 18ª in Fig. 2.

To control the appropriate movement of the nut to cause the longitudinal traverse to the left and to the right of the slide rod 21, which carries the rock nut, I provide a controlling latch in the form of a bell crank lever 23 fulcrumed above the screw 18, so that when its horizontal arm is rocked downward it engages the underneath arm of the nut and depresses it into operative engagement with the rotating screw 18, thereby causing the nut to travel toward the right until it reaches the bare or smooth end of the screw shaft 18 where it can continue to idle.

A similar latch or lever 24 with its nut engaging arm extending in the opposite direction is fulcrumed above the right end of the screw shaft 19, while both these latches have their upper ends slotted to receive pins 25 secured to the slide rod 26 by which they are actuated, it being understood that when lever 23 is depressed to engage the nut with the screw 18 the actuating arm of latch 24 is raised to permit the rocking movement of the nut and vice versa. It will, therefore, be seen that the position of both latches, one depressed and one raised, depends upon the position of the actuating bar 26.

The movement of the actuating bar 26 to the left is effected by means of the feeler member 8, while its movement in the opposite direction to the right is effected by means of the feeler member 8ª which is arranged to engage the seam before it reaches the cloth rest 2ᵇ. It should be understood that the seam-actuated feeler 8ª, while arranged to be actuated by the seam approaching the cloth rest 2ᵇ which engages that side of the cloth that has previously been sheared over cloth rests 2 and 2ª, does not actually effect the raising of the cloth rests until, owing to the rapid travel of the cloth, the seam has actually passed by the reverse side shearing couple since a certain interval of time must elapse before the mechanism set in operation by the feelers actually causes the cloth rests to drop or to rise.

I will now describe the particular mechanism employed in this case by which the control rod causes the rest-dropping and rest-raising mechanism to act.

Near the front of the machine is pivotally mounted at 30 a vibrating or oscillating actuator arm 31 carrying, at its upper end, an apertured tooth 32. This vibrator arm has a pitman connection 33 with an eccentric pin 34 carried by the rotary shaft 35, which shaft is rotated by a pinion connection 36 with a driving pinion 37 on the shaft 15 of the machine. On the left hand end of the control rod 26 is mounted a hook latch 38, whose upright arm is provided with a transverse slot to receive the hooked end of the connecting rod 10, which is pulled toward the left by the lever 9 when the feeler 8 is lifted by the seam passing beneath it. When the hook latch 38 is depressed by such action of the feeler its hook is brought down into engagement with the lower portion of the top edge of the tooth 32 and, as the vibrator 31 moves to the left, it exerts a pull to the left on the control rod 26 thereby depressing latch 23 and lifting latch 24 so as to engage the rock nut 22 with the screw 18.

A companion latch 39 mounted on the other side of the left end of the control rod 26 has its lower or horizontal arm passing through the aperture in the tooth 32 but formed with a shoulder that is adapted to receive the thrust of the vibrator tooth 32 when the latter is moving toward the right, provided the latch 39 is raised to bring its shoulder into engagement with the upper edge of the aperture in the tooth 32. Hence it is that the vibrator, according to the position of the two latches, exerts a pull on the latch 38 when it is depressed by feeler 8 and a push on the latch 39, when it is raised by the feeler 8ª, the connecting arm 9ª and the connecting rod 10ª.

You have already seen that the actuator rod 21 moves toward the right when the latch 23 is depressed and toward the left when latch 24 is depressed, hence hook latch 38 controls the operative movement of latch 23 and abutment latch 39 controls the operative movement of latch 24.

The actuating rod or bar 21, at its left hand end, is provided with an actuating pin and slot connection with the rock arm 40, which is loosely mounted on the rock shaft 41. Keyed or pinned to the rock shaft 41 is an arm 11 which forms one element of the toggle by reason of its pivotal connection with the other toggle link 12 pivotally connected to the cloth rest 2ª, so that, after the arm 11 is moved from its normally rest-sustaining position, shown in Fig. 1, toward the left, a substantial distance beyond the dead center, it allows the cloth rest 2ª to drop. As shown in Fig. 8, the downwardly extending sector arm 11ᶜ of the lever 11 has a slot for limiting the rocking motion of the lever in each direction as previously explained.

In order that provision may be made for independent hand control of the cloth, without interference with the automatic control, the operative connection between the actuating lever 40 and the toggle member 11, I have provided a releasable connection between the actuating lever 40 and the toggle arm 11, which I will now describe.

As viewed from the rear or left hand side of the machine, as shown in Fig. 9, the actuating lever 40 is provided with a hub member 40ª having two opposed shoulders 40ᵇ and 40ᶜ. On the rear face of the toggle lever 11 is pivoted a pawl 42 arranged to normally abut against the shoulder 40ᶜ and there is also pivoted a pawl 43 arranged to abut against the opposed shoulder 40ᵇ. A connecting link 44 connects these two pawls so that, when the pawl 42 is thrown out of position for engagement with the shoulder 40ᶜ by its rock spindle 42ª, as will be presently described, the pawl 43 is also thrown out of engagement with its shoulder 40ᵇ on the hub of the actuating lever. In this position the actuating lever is disengaged from any operative connection with the toggle member and allows the toggle arm 11 to move independently of the actuating lever 40 to flex or to straighten the lever in order to drop or to raise the cloth rest respectively.

This release of the pawls 42, 43 is effected by a movement toward the front of the machine of the connecting rod 51 (which, at its forward end, is connected to the hand lever 50 at the front of the machine) during the initial part of the forward travel of said rod 51. The further forward travel of the rod 51 acts to flex the toggle in order to drop the cloth rest, as will now be explained.

Both pawls 42 and 43 are pivotally mounted on the toggle arm 11, as best shown in Fig.

9, as seen from the left hand side of the machine. As shown in Fig. 2 and Fig. 8, the connecting rod 51 is connected with the toggle-operating rock shaft 41 by means of the arm 53 securely pinned to the right hand end of the rock shaft 41. As toggle arm 11 is also fast on said rock shaft it is obvious that the forward movement of the connecting rod 51 must flex the toggle but, as such action can not take place until the pawls have been released from the automatically controlled actuator lever 40 the connection between the connecting rod 51 and the arm 53 is made by a pin and slot connection, as shown at 52, said rod 51 being pulled rearwardly by the tension of a retractile spring 51$^a$ to keep the forward end of the slot in contact with the pin 52. This gives an opportunity for the pawl-releasing mechanism to act before the rear end of the slot engages said pin to actuate the lever 11 in flexing the toggle. The release of the pawl 42 is effected through the movement of the rock spindle 42$^a$ to which it is secured and this rocking movement is accomplished by a short arm 55, which is connected by a horizontal pin 55$^a$ with the connecting rod 51, as shown in Fig. 2 and Fig. 8. The pawl link 44 connects the pawl 41 with the pawl 42, so that the rocking of the pawl spindle 42$^a$ communicates releasing motion to both pawls. Since there is no lost motion in the connection between the connecting rod 51, the rock spindle 42$^a$ and the pawl 42, it is obvious that this rock spindle will be moved to release the pawls before the rear end of the slot in the connecting rod 51 engages the pin carried by the rock arm 43 fast on the rock shaft 41. When the operator releases the hand lever 50, after having flexed the toggle by the forward pull, as above explained, the retractile spring 51$^a$ then moves the connecting rod 51 until the forward end of the slot once more engages the pin 52 of the arm 53, thus restoring the pawls to operative position so that the cloth rest may then be raised either by a rearward push on the lever 50, or by a forward movement of the actuating arm 40 through its automatic controlling and actuating mechanism, because in that position of the parts, after the hand lever 50 has been pulled forward, it will be seen that the arm 40 is left in its rearward position with the teeter nut 22 in its rearmost position ready to be engaged by the rear bell crank arm 24 to connect it with the feed screw 19 when the slide bar 26 is moved back by the actuator tooth 32 whenever the feeler 8$^a$ is lifted by the seam to cause engagement between the latch 39 and the tooth.

It will be seen that the actual lowering and raising of the cloth rests through automatic control is effected by power driven mechanism that is put into action merely by the throwing of a light latch through the slight lifting of the cloth feeler, so that the device is very sensitive and responsive and does not put any objectionable stress or strain on the cloth when the seam engages and actuates the feeler. Furthermore, while the automatic control is ready at all times to drop the cloth rests and after a suitable interval to restore them to operative position, nevertheless the cloth rests are always under the control of the operator, who can throw his hand lever forward to drop the rests and thereafter throw it to the rear to raise the cloth rests without interfering with the proper setting of the automatic control mechanism.

The principle of construction and arrangement permits its application to a shearing machine having either a single shear couple or any desired number, regardless of whether the additional shear couples operate on the same side of the cloth or on the opposite side of the cloth, since each pair of toggle links may be connected to a common connecting rod 60 so that when the master toggle, with which is associated the means for connecting it operatively with either the automatically actuated mechanism or the hand operated mechanism, moves the corresponding movement will be communicated to the other toggle couples.

What I claim is:

1. The combination with a shearing couple of a pivotal cloth rest formed with a gap extending transversely of the machine in position to support the cloth on both sides of the shearing line, power driven actuating mechanism for moving the cloth rest to and from operative position for shearing, a seam-actuated device by which said actuating mechanism is started in action to move the rest away from operative position, and another seam-actuated device that puts the rest-actuating mechanism into action to restore the rest to normal operative position.

2. In a multiple cloth shear, the combination with a plurality of shearing couples, of co-acting movable cloth rests arranged to support the cloth in operative position to be sheared by the respective shearing couples, power driven actuating mechanism interconnected with the several cloth rests to move them from and to operative relationship to their respective shearing couples, a seam-actuated device for starting said rest-actuating mechanism to move said cloth rests from operative position, a second seam-controlled device for putting said rest-actuating means into action in the reverse direction to restore said cloth rests to normal operative position.

3. The combination with a plurality of shearing couples, of movable cloth rests operatively associated with the respective shearing couples, reversible power driven rest-actuating mechanism operatively connected with all said cloth rests to move them simultaneously to and from operative position, a seam-actuated feeler device arranged to start said actuating mechanism in operation to move the cloth rests from operative position to allow the passage of a seam, and another seam-actuated feeler device for setting the actuating mechanism in reverse operation to restore the rests to operative position.

4. In a cloth shearing machine, seam-controlled means for actuating a cloth supporting rest to and from operative position embracing in combination reversely rotating shafts, a travelling member arranged to be moved into operative engagement with one or the other of said shafts in order to be driven by either one or the other in opposite directions, seam-controlled means for establishing operative relation between said travelling member and one of said rotating shafts, means interconnected with said travelling member for moving the cloth rest from its operative position, another seam-controlled device for establishing operative relation between said travelling member and the reversely rotating shaft to cause the movement of the cloth rest to normal operative position after the seam has travelled by the cloth rest.

5. An actuating device for moving one or more cloth rests to and from operative position to allow the passage of the cloth seam beyond the shearing line, embracing in its construction a pair of reversely rotating screw shafts, a traveller arranged to be shifted to position to engage one or the other of said shafts, said traveller having intermediate actuating connection with a movable cloth rest to cause the movement of the rest from operative position and to restore it thereto, according to the direction of travel of the traveller produced by engagement with one or the other of said screw shafts, means for controlling said traveller to engage it with one or the other of said rotating shafts, said means being controlled by seam-actuated devices arranged at different points along the line of travel of the cloth.

6. Actuating mechanism for moving the cloth rest of a shearing machine to and from operative shearing position, embracing in its construction a pair of oppositely rotating screw shafts, a threaded traveller pivotally mounted to be moved into engagement with one or the other of said screw shafts, means for establishing operative engagement between said traveller and either one of said screw shafts to cause movement of the traveller in opposite directions, a vibratory actuator, seam-controlled means for establishing operative relation between the traveller controlling mechanism and said vibratory actuator to cause movement of the traveller controlling means alternately in opposite directions for establishing operative relation between the traveller and the respective screw shafts, said traveller when moved in one direction operating to move the cloth rest from operative position and when moving in the opposite direction to cause said cloth rest to be restored to operative position.

7. Mechanism for actuating the cloth rest of a shearing machine to and from operative shearing position, embracing in its construction a pair of reversely rotating threaded shafts, a traveller member mounted to be rocked into engagement with one or the other of said shafts to cause its travel in opposite directions, a pair of levers arranged to rock said traveller alternately into threaded engagement with the respective threaded shafts, a power driven vibratory actuator, means for intermittently establishing operative relation between said levers and said actuator comprising a pivotal latch and a seam-actuated device for moving said latch into operative transmission position to cause engagement of the traveller with one shaft, and another seam-actuated device for moving a companion latch into operative position to release the traveller from the first-mentioned shaft and to engage it with the reversely rotating shaft to restore the cloth rests to operative position.

8. In a cloth shearing machine the combination of a cloth rest movable to and from operative shearing position, seam-controlled actuating mechanism for shifting the cloth rest from operative position and returning it thereto after an interval, a toggle couple for supporting said cloth rest in its operative position, a seam-controlled rock arm having releasable operating connection with one member of said toggle to flex or straighten the toggle, a hand lever having connection with said toggle couple to permit hand control thereof, independently of the seam-controlled mechanism, said hand controlled lever acting to release the operative connection between the toggle and the seam-controlled mechanism during the initial operation of the hand lever.

9. In a cloth shearing machine the combination with a cloth rest movable to and from operative shearing position, a toggle couple for actuating said rest to and from operative position, a hand operated lever having actuating connection with said toggle to move the cloth rest, power driven actuating mechanism having releasable operative connection with said toggle through a pawl and ratchet connection, seam-controlled means for setting the power driven actuating mechanism into action to flex and to extend the toggle, said hand lever connection acting when moved to release the pawls from operative relation to allow independent action by the hand lever without disturbing the seam-controlled actuating mechanism.

10. In a cloth shearing machine, the combination with a movable cloth rest, of a rest supporting and actuating toggle couple, a hand lever for actuating a link that has a lost motion connection with said toggle to flex and straighten the toggle thereby moving the rest from and to operative position, a spring for taking up the lost motion, a seam-controlled power actuated lever having releasable ratchet and pawl connection with said rest supporting toggle, said hand lever link having connection with said pawls to interrupt the operative connection between the power lever and the toggle to permit independent action by the hand lever.

11. In a cloth shearing machine the combination with shearing elements, of a coacting movable cloth rest adjacent thereto, rest-supporting means by which said rest is maintained in normal operative shearing position and by which it is shifted away from such position and thereafter restored thereto, power driven means by which said shifting means is actuated to move the rest away from normal shearing position and to restore it thereto, and seam-actuated means by which the power driven means is energized first to shift the rest to inoperative position and later to restore it to operative position.

12. In a cloth shearing machine the combination with shearing elements, of a coacting movable cloth rest adjacent thereto, supporting means for maintaining said cloth rest in its operative relation to the shearing elements and for shifting the rest away from and back to said operative relation, power driven means by which said shifting means is actuated to move the rest away from shearing position and restore it thereto, seam-actuated means by which the driven means is energized to actuate the rest-supporting means to move the rest from and to normal operative position, and manually controlled means by which the rest may be moved to either of its positions independently of the power driven means that actuates the cloth rest.

In witness whereof, I have subscribed the above specification.

CHARLES G. RICHARDSON.